United States Patent
Weber et al.

(10) Patent No.: US 11,777,968 B2
(45) Date of Patent: Oct. 3, 2023

(54) METHOD AND DEVICE FOR HANDLING AN ANOMALY AT A CONTROL UNIT

(71) Applicant: Robert Bosch GmbH, Stuttgart (DE)

(72) Inventors: Michael Weber, Magstadt (DE); Martin Ring, Lossburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 299 days.

(21) Appl. No.: 16/896,803

(22) Filed: Jun. 9, 2020

(65) Prior Publication Data
US 2021/0037034 A1    Feb. 4, 2021

(30) Foreign Application Priority Data

Aug. 1, 2019  (DE) .......................... 102019211570.5

(51) Int. Cl.
*G06F 21/70*   (2013.01)
*H04L 9/40*    (2022.01)
(Continued)

(52) U.S. Cl.
CPC ....... *H04L 63/1425* (2013.01); *G05D 1/0088* (2013.01); *G06F 21/70* (2013.01);
(Continued)

(58) Field of Classification Search
CPC .......... G06F 21/86; G06F 21/70; G06F 21/71; G06F 21/72; G06F 21/73; G06F 21/74; G06F 21/75; G06F 21/76; G06F 21/85
See application file for complete search history.

(56) References Cited

U.S. PATENT DOCUMENTS 7,120,421 B2 * 10/2006 Hermann .............. H04L 9/0891
                                                     455/410
9,578,763 B1 *  2/2017 Wade ...................... G06F 21/86
(Continued)

FOREIGN PATENT DOCUMENTS

CN       106209034 A  * 12/2016  ............. G06F 21/55
WO   WO-2017060511 A  *  4/2017  .......... B41J 2/17509

OTHER PUBLICATIONS

Arthur F. Huber II, etc., "The Role and Nature of Anti-Tamper Techniques in U.S. Defense Acquisition", Acquisition Review Quarterly—Fall 1999, pp. 355-368, obtained from <https://www.dau.edu/library/arj/ARJ/arq99/huber.pdf>, retrieved on Jun. 14, 2022 (Year: 1999).*

*Primary Examiner* — Farid Homayounmehr
*Assistant Examiner* — Zhimei Zhu
(74) *Attorney, Agent, or Firm* — NORTON ROSE FULBRIGHT US LLP; Gerard Messina

(57) ABSTRACT

A method and device for handling an anomaly at a unit. The device is integrated into the unit. A variable is detected for handling attacks on the unit that defines an operation of the unit. A piece of information is determined depending on the variable that characterizes surroundings in which the unit is operated. It is checked depending on a comparison of the piece of information about the surroundings to a piece information about the setpoint surroundings for the operation of the unit, whether or not an anomaly is present in the operation of the unit. The unit is operated in a first operating mode having a first functional range, if no anomaly is detected. The unit is operated in a second operating mode having a second functional range, which is reduced or changed with regard to the first functional range, if an anomaly is detected.

15 Claims, 1 Drawing Sheet

(51) Int. Cl.
    *G05D 1/00*        (2006.01)
    *G06F 21/71*       (2013.01)
    *G06F 21/86*       (2013.01)
    *G06F 21/74*       (2013.01)
    *G06F 21/75*       (2013.01)
    *G06F 21/73*       (2013.01)
    *G06F 21/85*       (2013.01)
    *B60R 16/023*     (2006.01)

(52) U.S. Cl.
    CPC .............. *G06F 21/71* (2013.01); *G06F 21/74* (2013.01); *G06F 21/86* (2013.01); *H04L 63/1416* (2013.01); *H04L 63/1441* (2013.01); *B60R 16/0232* (2013.01); *G06F 21/73* (2013.01); *G06F 21/75* (2013.01); *G06F 21/85* (2013.01)

(56) References Cited

U.S. PATENT DOCUMENTS

| | | | | |
|---|---|---|---|---|
| 9,941,880 | B1* | 4/2018 | Lesea | H03K 19/003 |
| 2004/0187035 | A1* | 9/2004 | Schwan | G06F 21/6209 |
| | | | | 713/182 |
| 2010/0332851 | A1* | 12/2010 | Priel | G06F 21/554 |
| | | | | 713/189 |
| 2014/0081508 | A1* | 3/2014 | Iida | G06F 11/1004 |
| | | | | 701/29.2 |
| 2017/0354027 | A1* | 12/2017 | Inoue | G06F 21/72 |
| 2019/0089724 | A1* | 3/2019 | Norton | G06F 21/81 |
| 2020/0042751 | A1* | 2/2020 | Hars | H05K 5/0208 |
| 2020/0074123 | A1* | 3/2020 | Meiler | G06F 21/86 |

* cited by examiner

METHOD AND DEVICE FOR HANDLING AN ANOMALY AT A CONTROL UNIT

CROSS REFERENCE

The present application claims the benefit under 35 U.S.C. § 119 of German Patent Application No. DE 102019211570.5 filed on Aug. 1, 2019, which is expressly incorporated herein by reference in its entirety.

BACKGROUND INFORMATION

Methods for detecting attacks use network intrusion detection systems to detect an attack based on anomalies. Attacks using certain attack vectors are therefore well detectable. It is desirable to further improve these methods for detecting attacks and to adapt same to the specific conditions of the field of automobiles.

SUMMARY

This may be achieved with the aid of the method and the device according to the present invention.

In one example embodiment of the present invention, the method for handling attacks on a unit for controlling a machine, in particular a vehicle or a component of a vehicle, provides that at least one variable is detected that defines an operation of the unit, in particular in a vehicle, or the surroundings of the unit, in particular in a vehicle, a piece of information being determined that characterizes the surroundings in which the unit is operated, depending on the variable, depending on a comparison of the information about the surroundings to a piece of information about the setpoint surroundings, it being checked for the operation of the unit, in particular in the vehicle, whether or not an anomaly is present in the operation of the unit, if no anomaly is detected, the unit is operated in a first operating mode having a first functional range, in particular for the vehicle, and the unit is operated in a second operating mode having a second functional range, which is reduced or different with regard to the first functional range, if an anomaly is detected. In this way, an attack on a control unit of a vehicle is detected, if the attack is carried out outside of the vehicle itself or in the surroundings that simulate the vehicle to an only insufficiently accurate extent. The limitation of the function makes the analysis and the continuation of the attack more difficult or completely foils the attack with regard to a control unit in normal operation.

The variable preferably characterizes a communication of the unit, in particular in a communication network. An attack using a frequently employed attack vector is thus made more difficult or foiled.

It is preferably provided that the surroundings, in which the unit is operated, are characterized by messages for communication that are transmitted in a cryptographically secured manner, the anomaly being detected, if it is established that a received message is cryptographically secured in an unknown or inadmissible manner. The admissible keys are usually unknown to the attacker. An attack using a different key is thus made more difficult or foiled. An encryption and decryption using a cryptographic pair of keys is an example of a cryptographic security of this type. A received message is inadmissible, for example, if it is encrypted using an unknown key.

The surroundings, in which the unit is operated, are preferably characterized by at least one counterpart for communication (communication counterpart) outside of the unit, the anomaly being detected if it is established that a message is received from an unknown counterpart or a receipt of an expected message of a counterpart fails to happen. The attack is made more difficult, since the known unit outside of the usual surroundings must also be present to carry out the attack. The method may be expanded arbitrarily to all control units of a vehicle to provide security for the entire vehicle.

In the case of a cryptographically secured communication, a message counter is preferably used, which evaluates the information about a relation between the messages in the communication, the anomaly being detected if an inadmissible or unknown relation between the messages in the communication is established as a function of an evaluation of the message counter. The latter effectively prevents the communication from being recorded and played at a later point in time. This is a particularly effective detection method.

The variable preferably characterizes a voltage or current supply of the unit, in particular in a supply network of the vehicle, the anomaly being detected if a deviation of a characteristic curve of the voltage or current supply from an expected characteristic curve is established. The voltage or current supply of a vehicle fluctuates as a function of the operating state of the individual components. The knowledge of the allowed fluctuations is unknown to an attacker. The attack is additionally made more difficult by this monitoring.

It is preferably provided that the surroundings, in which the unit is operated, is characterized by a characteristic curve of the voltage or current supply, the deviation being detected if the characteristic curve of the voltage or current supply has a constant value at least temporarily or if the voltage or current supply has fluctuations within a range about a constant value at least temporarily. A voltage or current supply that is used outside of the vehicle is thus particularly easily detectable.

The variable preferably characterizes a current from a photodiode or through a circuit, the surroundings in which the unit is operated being characterized by a characteristic curve of the current, the anomaly being detected if it is established that the current is generated by the photodiode or that there is no current flowing through the circuit. In this way, an opening of the control unit that is necessary in the case of many attack vectors is easily detectable.

The variable preferably characterizes a switching-on or switching-off process of the unit, the surroundings in which the unit is operated being characterized by a course of the switching-on or switching-off process of the unit, the anomaly being detected if it is established that the switching-on or switching-off process of the unit is carried out more infrequently than a predefined minimum number or more frequently than a predefined maximum number within a time interval or is carried out only incompletely or is aborted with regard to reaching the first operating mode. Control units are switched on or off in a vehicle according to certain specifications. The knowledge of these specifications is not available to the attacker. In this way, an attack that requires frequent switching-on or switching-off processes or a long operating time of the control unit is easily detected.

The unit is preferably operated in the second operating mode for a predefined period of time, after the anomaly has been established. Functions may be switched off in the second operating mode. In this way, an attack on these functions is prevented.

Functions from the first functional range that characterize a privileged function of the unit are preferably missing in the second functional range. Privileged functions are preferably switched off in the second operating mode. In this way, an attack on these privileged functions is prevented.

An error is preferably stored in an error memory, if the anomaly is detected. In this way, an attack is also detectable after the event.

The device for handling an anomaly in a unit, in particular a control unit for a machine or a vehicle, is characterized in that the device is integrated into the unit and includes a processor, an interface, and a memory for instructions and is designed to carry out the method, when the processor carries out the instructions.

It is preferably provided that the interface is designed as a communication interface for a particularly cryptographically secured communication with a counterpart outside of the unit or that the interface is designed to detect an opening, in particular including a photodiode, through which current is generated in the case of an open housing of the unit, or a circuit that is open in the case of an open housing of the unit and closed in the case of a closed housing, or that the interface is designed as a current or voltage measuring device for detecting a characteristic curve of a current or voltage of a current or voltage supply from outside the unit.

Other advantageous specific embodiments result from the description below and the figures.

DETAILED DESCRIPTION OF EXAMPLE EMBODIMENTS

Figure 1:
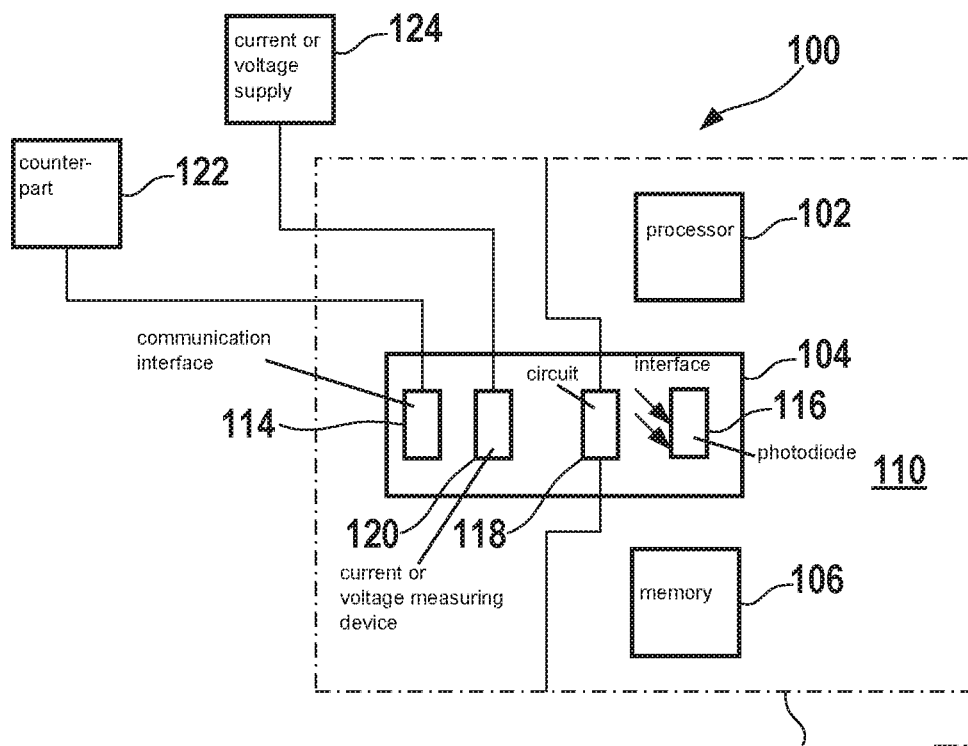
FIG. 1 shows a schematic illustration of an example device for handling an anomaly in accordance with the present invention.

FIG. 1 schematically illustrates an example device 100 for handling an anomaly in a unit 110, in accordance with the present invention. An anomaly refers in the following to a deviation of a behavior from an expected behavior. The expected behavior may be predefined or learned in a normal operation, i.e., an operation without an anomaly. In the normal operation, unit 110 is operated in a setpoint surroundings. Unit 110 is a control unit for a vehicle in the present example. The setpoint surroundings are defined by the vehicle in the present example, for which unit 110 is approved according to the road traffic regulations (Straßenverkehrsordnung) and in which unit 110 has been tested for approval based on system tests. The term "setpoint surroundings" includes defined conditions as well as analog and digital interfaces of unit 110. The surroundings, in which unit 110 is operated, may deviate therefrom, for example if the vehicle is replaced by a simulation surroundings or unit 110 is operated by itself in a laboratory. It is also possible that a control unit is designed in such a way for a different machine. In this case, a surroundings of the machine is contemplated in an industrial setting, for example. The industrial setting also has known, defined conditions.

Device 100 is integrated into unit 110 in the present example. Parts of device 100 may also be situated outside of unit 110.

Device 100 includes a processor 102, an interface 104, and a memory 106 for instructions.

Device 100 is designed to carry out the method described in the following, when processor 102 carries out the instructions. Processor 102 may be a microcontroller. The detection methods described in the following may be combined. In this way, a detection quality with regard to a single detection method is further improved and countermeasures of an attacker are made considerably more difficult.

Interface 104 may be designed as a communication interface 114 for a particularly cryptographically secured communication with a counterpart 122 outside of unit 110.

Interface 104 may be designed to detect an opening. In this case, interface 104 may include a photodiode 116, through which a current is generated in the case of an open housing 112 of unit 110. Additionally or alternatively, interface 104 may include a circuit 118 that is open in the case of an open housing 112 of unit 110 and closed in the case of a closed housing 112.

Interface 104 may also be designed as a current or voltage measuring device 120 for detecting the characteristic curve of a current or voltage of a current or voltage supply 124 from outside of unit 110.

Figure 2:
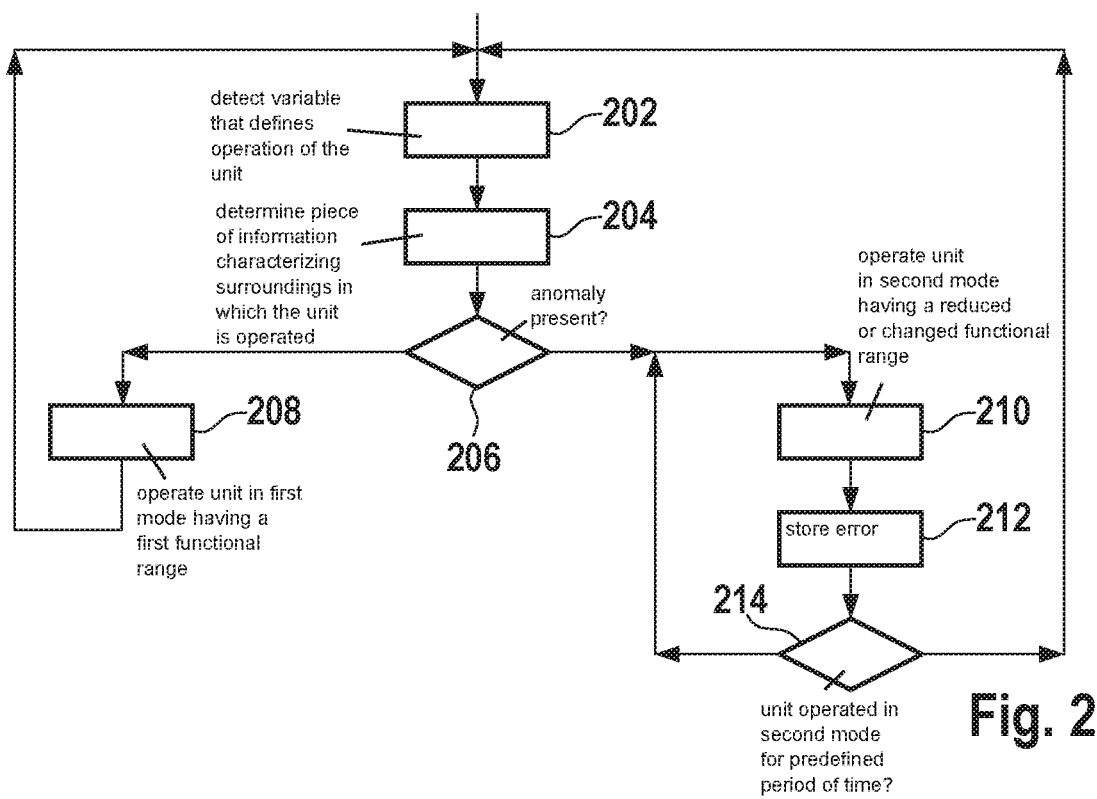
FIG. 2 shows steps in an example method for handling an anomaly in accordance with the present invention.

FIG. 2 shows steps in an example method for handling an anomaly in accordance with the present invention.

The method is suitable for handling attacks on unit 110. In the present example, unit 110 is designed to control the vehicle or to control a component of the vehicle. The method is preferably carried out continuously, when the vehicle is operated.

In a step 202, a variable is detected that defines an operation of unit 110, in particular in the vehicle or the surroundings of unit 110, in particular in the vehicle. If unit 110 is uninstalled from the vehicle for an attack, the variable characterizes the attack surroundings.

The variable characterizes, for example, a communication of unit 110, in particular in a communication network.

In a subsequent step 204, a piece of information characterizing the surroundings in which the unit is operated is determined as a function of the variable. The surroundings in which unit 110 is operated is characterized by the messages for the communication, for example, that are sent in a cryptographically secured manner. The surroundings in which the unit is operated may also be characterized by a counterpart for the communication outside of the unit.

In the case of a cryptographically secured communication, a message counter is used that evaluates the information about a relation between the messages in the communication.

As a function of a comparison of the piece of information about the surroundings to the piece of information about the setpoint surroundings for the operation of the unit, in particular in the vehicle, it is checked in a subsequent step 206, whether or not an anomaly is present in the operation of the unit. The anomaly is detected, for example, if it is established that a received message is cryptographically secured in an unknown or inadmissible manner. The anomaly may also be detected, if it is established that a message is received from an unknown counterpart or a receipt of an expected message of a counterpart fails to happen.

The anomaly may also be detected, if an inadmissible or unknown relation between the messages in the communication is established as a function of an evaluation of the message counter.

If no anomaly is detected, a step 208 is carried out. Otherwise, a step 210 is carried out.

In step 208, unit 110 is operated in a first operating mode having a first functional range, in particular for the vehicle, if no anomaly is detected. Subsequently, step 202 is carried out.

In step 210, the unit is operated in a second operating mode having a functional range, which is reduced or changed with regard to the first functional range, if an anomaly is detected. Functions from the first functional range that characterize a privileged function of the unit are missing in the second functional range, for example.

In a subsequent step 212, an error is stored in an error memory, if the anomaly is detected. This step is optional. Information about the type of error may be stored.

It is subsequently checked in a step 214, whether unit 110 was operated in the second operating mode for a predefined period of time, after the anomaly had been established. This step is optional. When this period of time has been completed or exceeded, step 202 is carried out. Otherwise, step 210 is carried out.

Instead of monitoring the communication or in addition thereto, other types of monitoring may be used.

The variable may characterize a voltage or current supply of unit 110, in particular in a supply network of the vehicle. The surroundings in which the unit is operated may be characterized by a characteristic curve of the voltage or current supply in this case.

The anomaly is detected in this case, if a deviation of a characteristic curve of the voltage or current supply from an expected characteristic curve is established. The deviation is detected, for example, if the characteristic curve of the voltage or current supply has a constant value at least temporarily or if the voltage or current supply has fluctuations within a range about a constant value at least temporarily.

The variable may be characterized by a current from a photodiode or through a circuit. The surroundings, in which the unit is operated, is characterized by a characteristic curve of the current in this case. The anomaly is detected, for example, if it is established that the current is generated by the photodiode or that there is no current flowing through the circuit.

The variable may characterize a switching-on or switching-off process of the unit. The surroundings, in which the unit is operated, may be characterized by a course of the switching-on or switching-off process of unit 110 in this case. The anomaly is detected, for example, if it is established that the switching-on or switching-off process of the unit is carried out more rarely than a predefined minimum number or more frequently than a predefined maximum number within a time interval. The anomaly may, for example, also be detected if the switching-on or switching-off process of unit 110 is carried out only incompletely or is aborted with regard to reaching the first operating mode.

What is claimed is:

1. A method for handling attacks on a unit for controlling a machine, wherein the machine is a vehicle or a component of the vehicle, the method comprising the following steps:
   detecting at least one variable that defines an operation of the unit in the vehicle;
   determining a piece of information that characterizes surroundings in which the unit is operated as a function of the detected variable;
   checking, as a function of a comparison of the piece of information about the surroundings to a piece of information about a setpoint surroundings for the operation of the unit in the vehicle, whether or not an anomaly that is caused by an electronic communication is present in the operation of the unit;
   operating the unit in a first operating mode having a first functional range for the vehicle, when no anomaly is detected; and
   operating the unit in a second operating mode having a second functional range for the vehicle, which is reduced or changed with regard to the first functional range, when the anomaly is detected, wherein the variable characterizes a switching-on or switching-off process of the unit, the surroundings in which the unit is operated being characterized by a course of the switching-on or switching-off process of the unit, the anomaly being detected when it is established that the switching-on or switching-off process of the unit is: (i) carried out more infrequently than a predefined minimum number within a time interval, or (ii) carried out only incompletely, or (iii) aborted with regard to reaching the first operating mode.

2. The method as recited in claim 1, further comprising:
   detecting the anomaly based on the checking, wherein the unit is operated in the second operating range based on the detecting the anomaly.

3. The method as recited in claim 2, wherein the unit is operated in the second operating mode for a predefined period of time after the anomaly has been established.

4. The method as recited in claim 1, wherein the variable characterizes a communication of the unit in a communication network.

5. The method as recited in claim 4, wherein the surroundings in which the unit is operated is characterized by messages for the communication that are transmitted in a cryptographically secured manner, the anomaly being detected when it is established that a received message is cryptographically secured in an unknown or inadmissible manner.

6. The method as recited in claim 4, wherein the surroundings in which the unit is operated is characterized by at least one counterpart for the communication outside of the unit, the anomaly being detected if it is established that a message is received from an unknown counterpart or a receipt of an expected message of a counterpart fails to happen.

7. The method as recited in claim 4, wherein, in the case of a cryptographically secured communication, a message counter is used that evaluates a piece of information about a relation between messages in the communication, the anomaly being detected if an inadmissible or unknown relation between the messages in the communication is established as a function of an evaluation of the message counter.

8. The method as recited in claim 1, wherein the variable characterizes a voltage or current supply of the unit in a supply network of the vehicle, the anomaly being detected when a deviation of a characteristic curve of the voltage or current supply from an expected characteristic curve is established.

9. The method as recited in claim 8, wherein the surroundings in which the unit is operated is characterized by a characteristic curve of the voltage or current supply, the deviation being detected when the characteristic curve of the voltage or current supply has a constant value at least temporarily or when the voltage or current supply has fluctuations within a range about a constant value at least temporarily.

10. The method as recited in claim 1, wherein the variable characterizes a current from a photodiode or through a circuit, the surrounding in which the unit is operated being characterized by a characteristic curve of the current, the anomaly being detected when it is established that the current is generated by the photodiode or that there is no current flowing through the circuit.

11. The method as recited in claim 1, wherein functions from the first functional range that characterize a privileged function of the unit are missing in the second functional range.

12. The method as recited in claim 1, wherein an error is stored in an error memory when the anomaly is detected.

13. A device for handling an anomaly in a control unit for a machine or a vehicle, wherein the device is integrated into the control unit and includes a processor, an interface, and a memory to store instructions, wherein the processor is configured to carry of the instructions, the instructions causing the device to perform the following:

detecting at least one variable that defines an operation of the control unit;
  determining a piece of information that characterizes surroundings in which the control unit is operated as a function of the detected variable;
  checking, as a function of a comparison of the piece of information about the surroundings to a piece of information about a setpoint surroundings for the operation of the control unit, whether or not an anomaly that is caused by an electronic communication is present in the operation of the control unit;
  operating the control unit in a first operating mode having a first functional range, when no anomaly is detected; and
  operating the control unit in a second operating mode having a second functional range, which is reduced or changed with regard to the first functional range, when the anomaly is detected, wherein the variable characterizes a switching-on or switching-off process of the unit, the surroundings in which the unit is operated being characterized by a course of the switching-on or switching-off process of the unit, the anomaly being detected when it is established that the switching-on or switching-off process of the unit is: (i) carried out more infrequently than a predefined minimum number within a time interval, or (ii) carried out only incompletely, or (iii) aborted with regard to reaching the first operating mode.

14. The device as recited in claim 13, wherein the interface includes: (i) a communication interface for a cryptographically secured communication with a counterpart outside of the control unit, or (ii) a photodiode through which current is generated in the case of an open housing of the control unit, or (iii) a circuit that is open in the case of an open housing of the control unit and closed in the case of a closed housing of the control unit, or (iv) a current or voltage measuring device configured to detect a characteristic curve of a current or voltage of a current or voltage supply from outside the control unit.

15. A non-transitory computer-readable memory medium on which is stored a computer program for handling attacks on a unit for controlling a machine, wherein the machine is a vehicle or a component of the vehicle, the computer program, when executed by a computer, causing the computer to perform the following steps:

detecting at least one variable that defines an operation of the unit in the vehicle;
  determining a piece of information that characterizes surroundings in which the unit is operated as a function of the detected variable;
  checking, as a function of a comparison of the piece of information about the surroundings to a piece of information about a setpoint surroundings for the operation of the unit in the vehicle, whether or not an anomaly that is caused by an electronic communication is present in the operation of the unit;
  operating the unit in a first operating mode having a first functional range for the vehicle, when no anomaly is detected; and
  operating the unit in a second operating mode having a second functional range for the vehicle, which is reduced or changed with regard to the first functional range, when the anomaly is detected, wherein the variable characterizes a switching-on or switching-off process of the unit, the surroundings in which the unit is operated being characterized by a course of the switching-on or switching-off process of the unit, the anomaly being detected when it is established that the switching-on or switching-off process of the unit is: (i) carried out more infrequently than a predefined minimum number within a time interval, or (ii) carried out only incompletely, or (iii) aborted with regard to reaching the first operating mode.

\* \* \* \* \*